US012305531B2

(12) United States Patent
Ghigliotty Rosado et al.

(10) Patent No.: US 12,305,531 B2
(45) Date of Patent: May 20, 2025

(54) SKIN PASSAGEWAY TRIP STRIPS

(71) Applicant: RTX Corporation, Farmington, CT (US)

(72) Inventors: Jaime G. Ghigliotty Rosado, Cabo Rojo, OR (US); Brandon W. Spangler, Vernon, CT (US); David E. Gambardella, Tucson, AZ (US); Benjamin B. Simpson, Rogersville, TN (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/807,026

(22) Filed: Aug. 16, 2024

(65) Prior Publication Data

US 2025/0059893 A1 Feb. 20, 2025

Related U.S. Application Data

(60) Provisional application No. 63/533,107, filed on Aug. 16, 2023.

(51) Int. Cl.
*F01D 5/18* (2006.01)

(52) U.S. Cl.
CPC .......... *F01D 5/186* (2013.01); *F05D 2220/32* (2013.01); *F05D 2230/21* (2013.01); *F05D 2230/60* (2013.01); *F05D 2260/202* (2013.01); *F05D 2260/22141* (2013.01)

(58) Field of Classification Search
CPC ..................... F01D 5/186; F01D 5/187; F05D 2260/22141; F05D 2260/202
See application file for complete search history.

(56) References Cited

U.S. PATENT DOCUMENTS

| | | | | |
|---|---|---|---|---|
| 5,296,308 | A | 3/1994 | Caccavale et al. | |
| 5,695,321 | A | 12/1997 | Kercher | |
| 7,137,781 | B2 * | 11/2006 | Harvey | F01D 5/187 415/115 |
| 7,699,583 | B2 * | 4/2010 | Cunha | F01D 5/186 415/115 |
| 8,353,329 | B2 | 1/2013 | Gleiner et al. | |

(Continued)

OTHER PUBLICATIONS

Partial European Search Report dated Feb. 18, 2025 for European Patent Application No. 24193960.2.

*Primary Examiner* — Eldon T Brockman
(74) *Attorney, Agent, or Firm* — Bachman & LaPointe, P.C.

(57) ABSTRACT

A turbine engine airfoil element has: an airfoil having: an exterior surface including a pressure side and a suction side; and a plurality of spanwise passageways including: a plurality of main body passageways along a camber line; and a plurality of skin passageways between the main body passageways and the exterior surface, wherein; the skin passageways have: a downstream direction from one or more inlets; a skin side; first and second lateral rounded transitions from the skin side; a parting line; and a longitudinally spaced plurality of protrusions from the skin side; and the protrusions have a height profile having: first and second tapering portions tapering from a maximum height, the first and second portions extending downstream; and first and second inwardly concave transitions to the skin passageway lateral rounded transitions.

21 Claims, 12 Drawing Sheets

(56) References Cited

U.S. PATENT DOCUMENTS

| | | | | |
|---|---|---|---|---|
| 8,757,974 | B2 * | 6/2014 | Propheter-Hinckley | F01D 5/188 416/97 R |
| 9,267,381 | B2 * | 2/2016 | Morris | F01D 5/183 |
| 9,334,755 | B2 | 5/2016 | Riley et al. | |
| 9,759,071 | B2 * | 9/2017 | Wichmann | F01D 5/188 |
| 10,378,364 | B2 | 8/2019 | Spangler et al. | |
| 10,406,596 | B2 * | 9/2019 | Gleiner | F01D 9/041 |
| 10,563,514 | B2 * | 2/2020 | Bunker | F01D 5/145 |
| 10,626,729 | B2 | 4/2020 | Thomen et al. | |
| 11,111,857 | B2 | 9/2021 | Spangler | |
| 11,149,550 | B2 | 10/2021 | Spangler et al. | |
| 11,149,555 | B2 * | 10/2021 | Gallier | F01D 5/186 |
| 2013/0243591 | A1 | 9/2013 | Propheter-Hinckley et al. | |

* cited by examiner

SKIN PASSAGEWAY TRIP STRIPS

CROSS-REFERENCE TO RELATED APPLICATION

Benefit is claimed of U.S. Patent Application No. 63/533,107, filed Aug. 16, 2023, and entitled "Skin Passageway Trip Strips", the disclosure of which is incorporated by reference herein in its entirety as if set forth at length.

BACKGROUND

The disclosure relates to gas turbine engines. More particularly, the disclosure relates to airfoil cooling passageways and their manufacture.

Gas turbine engines (used in propulsion and power applications and broadly inclusive of turbojets, turboprops, turbofans, turboshafts, industrial gas turbines, and the like) internally-cooled hot section components. Key amongst these components are turbine section blades and vanes (collectively airfoil elements). Such cooled airfoil elements typically include generally spanwise/radial feed passageways with outlets (e.g., film cooling outlets) along the external surface of the airfoil. In typical designs, the feed passageways are arrayed streamwise along the camber line (median) between the leading edge and the trailing edge. In many airfoils, along the leading edge there is an impingement cavity fed by a leading feed passageway. Similarly, there may be a trailing edge discharge slot fed by a trailing feed passageway.

In various situations, the number of spanwise passageways may exceed the number of feed passageways if one of the passageways serpentines (e.g., a blade passageway having an up-pass leg from the root, a turn near the tip, and then a down-pass leg heading back toward the root). In some such implementations, the down-pass may, for example, feed the trailing edge discharge slot.

Whereas blades will have cooling passageway inlets along their roots (e.g., dovetail or firtree roots) with feed passageway trunks extending spanwise/radially outward from the root and into the airfoil, depending on implementation, vanes may more typically have inlets along an outer diameter (OD) shroud so that the feed passageways extend spanwise/radially inward.

However, there are alternatives including cantilevered vanes mounted at their outer diameter ends (e.g., for counter-rotating configurations) and the like.

U.S. Pat. No. 5,296,308, Mar. 22, 1994, to Caccavale et al. and entitled "Investment Casting Using Core with Integral Wall Thickness Control Means", (the '308 patent), shows a ceramic feedcore having spanwise sections for casting associated passageways. Additionally, the sections have protruding bumpers to space the feedcore centrally within an investment die for overmolding.

Additional forms of airfoil elements lack the traditional single grouping of upstream-to-downstream spanwise passages along the camber line of the airfoil. Instead, walls separating passages may have a lattice-like structure when viewed in a radially inward or outward view.

One example includes U.S. patent Ser. No. 10/378,364, Aug. 13, 2019, to Spangler et al. and entitled "Modified Structural Truss for Airfoils", (the '364 patent), the disclosure of which is incorporated by reference herein in its entirety as if set forth at length. Viewed in a spanwise/radial inward or outward section, the '364 patent shows a streamwise series of main air passageways falling along the camber line. In a particular illustrated example, three of those passageways have approximately a rounded-corner convex quadrilateral cross-section/footprint with an opposite pair of corners falling approximately along the camber line so that the leading corner of one passageway is adjacent the trailing corner of another.

Along the pressure and suction side, a series of respective rounded-corner triangular cross-section passageways (skin passageways) alternate with the main passageways with a base of the triangle approximately parallel to and spaced apart from the adjacent pressure or suction side and the opposite corner of the triangle pointed inward to create thin walls between such triangular passageway and the adjacent two main passageways. Depending upon implementation, the '364 configuration may be cast by a ceramic casting core assembly where a main feedcore forms the main passageways and any additional adjacent passageways falling along the camber line. A pressure side core and a suction side core may form the respective associated triangular passageways. Each such pressure side core or suction side core may have spanwise triangular section segments linked by core tie sections at spanwise intervals.

In some embodiments, the main passageways and the skin passageways may extend all the way to associated inlets (e.g., at an ID face of a blade root). In some embodiments, they remain intact/discrete all the way from the inlets and into the airfoil. In other embodiments, various of the passageways may merge (merger being viewed in the upstream direction of airflow through the passageways; with the passageways branching from trunks when viewed in the downstream airflow direction). One example of discrete intact passageways from inlets in a root is shown in U.S. patent Ser. No. 11/149,550, Oct. 19, 2021, to Spangler et al. and entitled "Blade neck transition", (the '550 patent), the disclosure of which is incorporated by reference herein in its entirety as if set forth at length.

Another example of passageway layout is shown in U.S. patent Ser. No. 11/111,857, Sep. 7, 2021, to Spangler and entitled "Hourglass airfoil cooling configuration", (the '857 patent), the disclosure of which is incorporated by reference herein in its entirety as if set forth at length.

SUMMARY

One aspect of the disclosure involves a turbine engine airfoil element comprising: an airfoil having: an exterior surface including a pressure side and a suction side; and a plurality of spanwise passageways. The spanwise passageways include: a plurality of main body passageways along a camber line; and a plurality of skin passageways between the main body passageways and the exterior surface. The skin passageways have: a downstream direction from one or more inlets; a skin side; first and second lateral rounded transitions from the skin side; a parting line; and a longitudinally spaced plurality of protrusions from the skin side. The protrusions have a height profile having: first and second tapering portions tapering from a maximum height, the first and second portions extending downstream; and first and second inwardly concave transitions to the skin passageway lateral rounded transitions.

In a further embodiment of any of the foregoing embodiments, additionally and/or alternatively the height profile is measured relative to a baseline formed by a passageway surface intersection with an inward surface normal from the adjacent outer surface at a location ahead of or behind the protrusion.

In a further embodiment of any of the foregoing embodiments, additionally and/or alternatively the tapering is such that the entirety of each of the protrusions, including the concave transitions, remains below a height of a maximum transverse width of the skin passageway.

In a further embodiment of any of the foregoing embodiments, additionally and/or alternatively, the maximum height is at a location at or below a height of maximum transverse width of the skin passageway.

In a further embodiment of any of the foregoing embodiments, additionally and/or alternatively, the inwardly concave transitions have a transverse span $S_F$ of at least 3% percent of a transverse width $W_{PO}$ of the associated passageway.

In a further embodiment of any of the foregoing embodiments, additionally and/or alternatively, the inwardly concave transitions have maximum protrusion $P_{HF}$ at a location at or below a height of maximum transverse width of the skin passageway.

In a further embodiment of any of the foregoing embodiments, additionally and/or alternatively, an average height of the protrusions away from the transitions is 65% to 90% of the maximum height.

In a further embodiment of any of the foregoing embodiments, additionally and/or alternatively, each of the tapering portions extends along a transverse span of at least 10% of the maximum passageway width $W_{PO}$.

In a further embodiment of any of the foregoing embodiments, additionally and/or alternatively, height of each protrusion along a transverse span of at least 3% of a transverse width $W_{PO}$ of the associated passageway is at least 30% of the maximum height.

In a further embodiment of any of the foregoing embodiments, additionally and/or alternatively, the height of each protrusion along a transverse span of 10% to 90% of a transverse width $W_{PO}$ of the associated passageway is at least 30% of the maximum height.

In a further embodiment of any of the foregoing embodiments, additionally and/or alternatively, protrusions have nested chevron footprints such that an upstream apex of a leading edge of a given protrusion is upstream of downstreammost extremes of the trailing edge of a protrusion ahead.

In a further embodiment of any of the foregoing embodiments, additionally and/or alternatively, adjacent said pressure side skin passageways connect to each other via a plurality of linking passageways.

In a further embodiment of any of the foregoing embodiments, additionally and/or alternatively, the skin passageways have rounded-corner triangular or quadrilateral cross-section.

In a further embodiment of any of the foregoing embodiments, additionally and/or alternatively, the turbine engine airfoil element has four to ten said skin passageways.

In a further embodiment of any of the foregoing embodiments, additionally and/or alternatively, the skin passageways each extend over at least 50% of a span of the airfoil.

In a further embodiment of any of the foregoing embodiments, additionally and/or alternatively, the turbine engine airfoil element is a blade having an attachment root wherein: the main body passageways extend from associated inlets at an inner diameter (ID) end of the root; and the skin passageways extend from associated inlets at the inner diameter (ID) end of the root.

In a further embodiment of any of the foregoing embodiments, additionally and/or alternatively, a turbine engine includes the turbine engine airfoil element.

In a further embodiment of any of the foregoing embodiments, additionally and/or alternatively, a method for manufacturing the turbine engine airfoil element comprises: assembling to each other a ceramic feedcore for forming the plurality of main body passageways and a ceramic skin core with grooves for forming the plurality of skin passageways and the associated protrusions; overmolding the assembly with a fugitive; shelling the fugitive to form a shell; casting alloy in the shell; and deshelling and decoring the cast alloy. Optionally the method further comprises: molding the ceramic skin core in a die having a first piece and a second piece, the first piece having ridges that mold the grooves; separating the first piece from the second piece; and releasing the core from the die. Optionally: the plurality of grooves are not molded by the second piece; the ridges are shaped with a rim tapering in height but having a fillet transitioning to project toward a local parting line between the first piece and the second piece.

In a further embodiment of any of the foregoing embodiments, additionally and/or alternatively, the fugitive is wax and the shell is dewaxed prior to the casting.

In a further embodiment of any of the foregoing embodiments, additionally and/or alternatively, molding the feedcore, the pressure side skin core, and the suction side skin core of ceramic material.

In a further embodiment of any of the foregoing embodiments, additionally and/or alternatively, a method for using the turbine engine airfoil element comprises: driving an airflow through the plurality of spanwise passageways; and said airflow exiting through a plurality of outlets from the skin passageways.

Another aspect of the disclosure is a method for manufacturing a casting core, the casting core having: a leg having a first face, the first face having a plurality of grooves. The method comprises: molding the core in a die having a first piece and a second piece, the first piece having ridges that mold the grooves; separating the first piece from the second piece; and releasing the core from the die. The plurality of grooves are not molded by the second piece. The ridges are shaped with a rim tapering in height but having a fillet transitioning to project toward a local parting line between the first piece and the second piece.

In a further embodiment of any of the foregoing embodiments, additionally and/or alternatively, a method for manufacturing a casting includes: said manufacturing the casting core; overnolding the casting core with a pattern material; shelling the overmolded casting core to form a shell; casting alloy in the casting shell; and deshelling and decoring.

In a further embodiment of any of the foregoing embodiments, additionally and/or alternatively, a maximum height of the ridge rim is between 80% and 100% of a height of the parting line.

In a further embodiment of any of the foregoing embodiments, additionally and/or alternatively, a difference between a maximum height of the ridge rim and a height of the parting line is not more than 200 micrometers (optionally more narrowly not more than 150 micrometers or not more than 125 micrometers).

Another aspect of the disclosure is a turbine engine airfoil element comprising: an airfoil having: an exterior surface having a pressure side and a suction side; and a plurality skin passageways along one of the pressure side and the suction side. The skin passageways have: a downstream direction from one or more inlets; a skin side; first and second lateral rounded transitions from the skin side; and a longitudinally spaced plurality of protrusions from the skin side. A pull direction exists such that; in transverse section, the skin passageways have a respective pair of lateral intersections with tangents parallel to said pull direction. For each said skin passageway, a parting line joins the intersections. The protrusions have a height profile having: first and second tapering portions tapering from a maximum height, the first and second tapering portions extending downstream; and first and second inwardly concave transitions to the skin passageway lateral rounded transitions. A difference (D) between a maximum height of the protrusions and a height of the parting line is not more than 200 micrometers (optionally more narrowly not more than 150 micrometers or not more than 125 micrometers); a difference (D) between a terminal height of the concave transitions and a height of the parting line is not more than 200 micrometers (optionally more narrowly not more than 150 micrometers or not more than 125 micrometers).

In a further embodiment of any of the foregoing embodiments, additionally and/or alternatively turbine engine airfoil element is a blade.

In a further embodiment of any of the foregoing embodiments, additionally and/or alternatively, the turbine engine element further comprising linking passageways between the skin passageways.

In a further embodiment of any of the foregoing embodiments, additionally and/or alternatively, the turbine element, wherein the skin passageways are along the pressure side.

Another aspect of the disclosure is a die for molding a casting core, the die having a closed condition and an open condition and comprising: a chamber formed by surfaces of a first piece and a second piece in the closed condition having a plurality of sections for molding respective legs of the casting core; and a pull direction for separating the first and second pieces from each other to release a molded casting core. For each chamber section, a parting line extends across the section between junctions of the first and second pieces. For each chamber section: a face of the first piece has a longitudinally spaced plurality of protrusions; a pair of lateral rounded transitions extend from the first face into the second piece; the protrusions have a height profile having: at least a first tapering portion first and second inwardly concave terminal transitions to or past the lateral rounded transitions; a difference (D) between a height of the protrusions and a height of the parting line away from the first and second inwardly concave transitions being not more than 200 micrometers (optionally more narrowly not more than 150 micrometers or not more than 125 micrometers); a difference (D) between a terminal height of the concave transitions and a height of the parting line is not more than 200 micrometers (optionally more narrowly not more than 150 micrometers or not more than 125 micrometers).

Another aspect of the disclosure is a die for molding a casting core, the die having a closed condition and an open condition and comprising: a chamber formed by surfaces of a first piece and a second piece in the closed condition having a plurality of sections for molding respective legs of the casting core; and a pull direction for separating the first and second pieces from each other to release a molded casting core. For each chamber section, a parting line extends across the section between junctions of the first and second pieces. For each chamber section: a face of the first piece has a longitudinally spaced plurality of protrusions; a pair of lateral rounded transitions extend from the first face into the second piece; the protrusions have a height profile having: first and second tapering portions tapering from a maximum height; first and second inwardly concave transitions to the lateral rounded transitions; a difference (D) between a maximum height of the protrusions and a height of the parting line being not more than 200 micrometers (optionally more narrowly not more than 150 micrometers or not more than 125 micrometers); a difference (D) between a terminal height of the concave transitions and a height of the parting line is not more than 200 micrometers (optionally more narrowly not more than 150 micrometers or not more than 125 micrometers).

In a further embodiment of any of the foregoing embodiments, additionally and/or alternatively a method for using the die comprises: molding the casting core in the die; separating the first piece from the second piece; releasing the core from the die; overmolding the casting core with a pattern material; shelling the overmolded casting core to form a shell; casting alloy in the casting shell; and deshelling and decoring.

Another aspect of the disclosure is a turbine engine airfoil element comprising: an airfoil having: an exterior surface; and a plurality of spanwise passageways including: a plurality of main body passageways along a camber line; and a plurality of skin passageways between the main body passageways and the exterior surface. The skin passageways have: a downstream direction from one or more inlets; a skin side; a maximum passage width; a parting line height between the skin side and a reference line representing the maximum passage width; first and second lateral rounded transitions from the skin side; and a longitudinally spaced plurality of protrusions from the skin side. The protrusions have a height profile having: first and second inwardly concave transitions to the skin passageway respective first and second lateral rounded transitions; and a first tapered portion between a maximum protrusion height and the first inwardly concave transition. The maximum protrusion height is between 80% and 100% of the parting line height. The height profile is measured relative to a baseline formed by a passageway surface intersection with an inward surface normal from the exterior surface at a location ahead of or behind the protrusion.

In a further embodiment of any of the foregoing embodiments, additionally and/or alternatively, a difference between the maximum protrusion height and parting line height is not more than 200 micrometers (optionally more narrowly not more than 150 micrometers or not more than 125 micrometers).

In a further embodiment of any of the foregoing embodiments, additionally and/or alternatively, the height profile includes a second tapered portion between the maximum protrusion height and the second inwardly concave transition.

In a further embodiment of any of the foregoing embodiments, additionally and/or alternatively, the first and second tapered portions extend from the maximum protrusion height in the downstream direction toward the inwardly concave transitions.

In a further embodiment of any of the foregoing embodiments, additionally and/or alternatively, the first and second inwardly concave transitions have a maximum protrusion $P_{HF}$ at or below the parting line height.

In a further embodiment of any of the foregoing embodiments, additionally and/or alternatively, the inwardly concave transition maximum protrusion $P_{HF}$ is between 80% and 120% of the maximum protrusion height.

In a further embodiment of any of the foregoing embodiments, additionally and/or alternatively, a difference in height between the inwardly concave transition minimum protrusion $P_{HFMIN}$ and inwardly concave transition maximum protrusion $P_{HF}$ is not more than 250 micrometers.

In a further embodiment of any of the foregoing embodiments, additionally and/or alternatively, minimum protrusion $P_{HFMIN}$ of the inwardly concave transition is at least 30% of the maximum protrusion height.

In a further embodiment of any of the foregoing embodiments, additionally and/or alternatively, the tapering is such that the entirety of each of the protrusions, including the concave transitions, remains below the parting line height.

In a further embodiment of any of the foregoing embodiments, additionally and/or alternatively, an average height of the protrusions away from the inwardly concave transitions is 65% to 90% of the maximum protrusion height.

In a further embodiment of any of the foregoing embodiments, additionally and/or alternatively, the first tapered portion extends along a transverse span of at least 10% of the maximum passage width $W_{PO}$.

In a further embodiment of any of the foregoing embodiments, additionally and/or alternatively, the skin passageways have a rounded-corner triangular cross-section.

In a further embodiment of any of the foregoing embodiments, additionally and/or alternatively, the skin passageways have a quadrilateral cross-section.

In a further embodiment of any of the foregoing embodiments, additionally and/or alternatively, the turbine engine airfoil element is a blade having an attachment root wherein: the main body passageways extend from associated inlets at an inner diameter (ID) end of the root; and the skin passageways extend from associated inlets at the inner diameter (ID) end of the root.

In a further embodiment of any of the foregoing embodiments, additionally and/or alternatively, a turbine engine includes the turbine engine airfoil element.

In a further embodiment of any of the foregoing embodiments, additionally and/or alternatively method for manufacturing the turbine engine airfoil element comprises: assembling to each other: a ceramic feedcore for forming the plurality of main body passageways; and a ceramic skin core with grooves for forming the plurality of skin passageways and associated protrusions; overmolding the assembly with a fugitive; shelling the fugitive to form a shell; casting alloy in the shell; and deshelling and decoring the cast alloy. The method further comprises: molding the ceramic skin core in a die having a first piece and a second piece, the first piece having ridges that mold the grooves; separating the first piece from the second piece; and releasing the core from the die, wherein: the plurality of grooves are not molded by the second piece; the ridges are shaped with a rim tapering in height but having a fillet transitioning to project toward a local parting line between the first piece and the second piece.

The details of one or more embodiments are set forth in the accompanying drawings and the description below. Other features, objects, and advantages will be apparent from the description and drawings, and from the claims.

Some of the sectional views show out of plane features for purposes of illustration.

Like reference numbers and designations in the various drawings indicate like elements.

DETAILED DESCRIPTION

With reference to a hypothetical baseline passageway configuration of generally similar cross-sectional size passageways, a modification of the baseline may add chevron trip strips to the outer surface.

The spanwise skin passageway legs of the baseline may be connected by linking passageways formed by core ties of the original casting core that cast the skin passageways as a group. To the extent that the baseline skin passageways each have film cooling outlets, there may be little pressure difference between adjacent skin passageway legs in the baseline. Thus, there may be little, if any, flow through the linking passageways in the baseline. Flow through skin passageways (discussed below) may be radially outward (tipward for a blade).

The detailed description of example embodiments herein makes reference to the accompanying drawings, which show example embodiments by way of illustration and their best mode. While these example embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
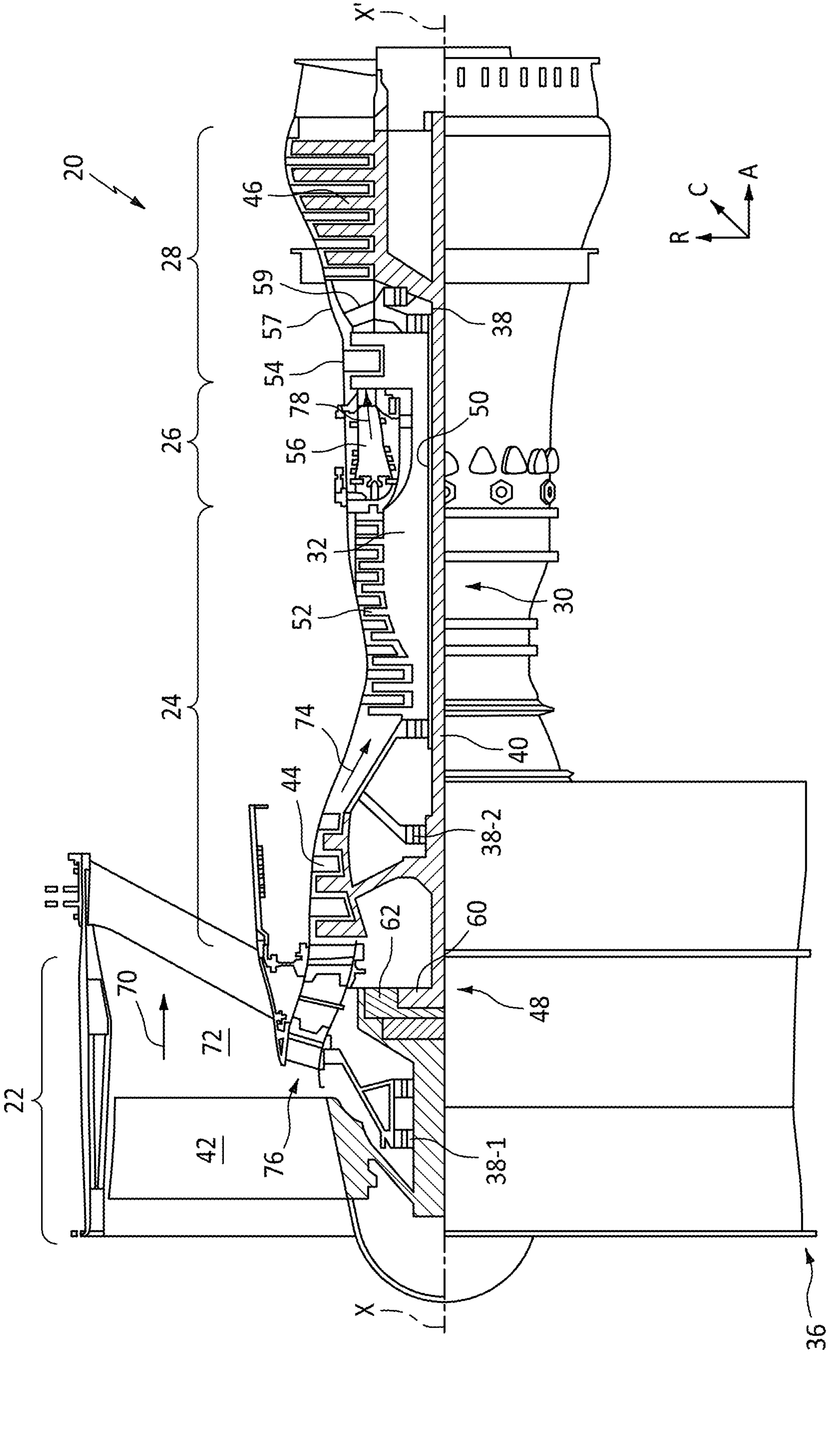
FIG. 1 is a cross-sectional view of an example gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air (bypass air flow) 70 along a bypass flow-path 72 while the compressor section 24 drives air (air flow) 74 along a core flow-path 76 for compression and communication into the combustor section 26 (for mixing with fuel and combusting) then expansion of the combustion gas 78 through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow is compressed by the low pressure compressor section 44 then the high pressure compressor 52, mixed and burned with fuel in the combustor 56, then the resulting combustion gas 78 is expanded over the high pressure turbine 54 and the low pressure turbine 46. The mid-turbine frame 57 includes airfoils 59 which are in the core flow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are examples of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
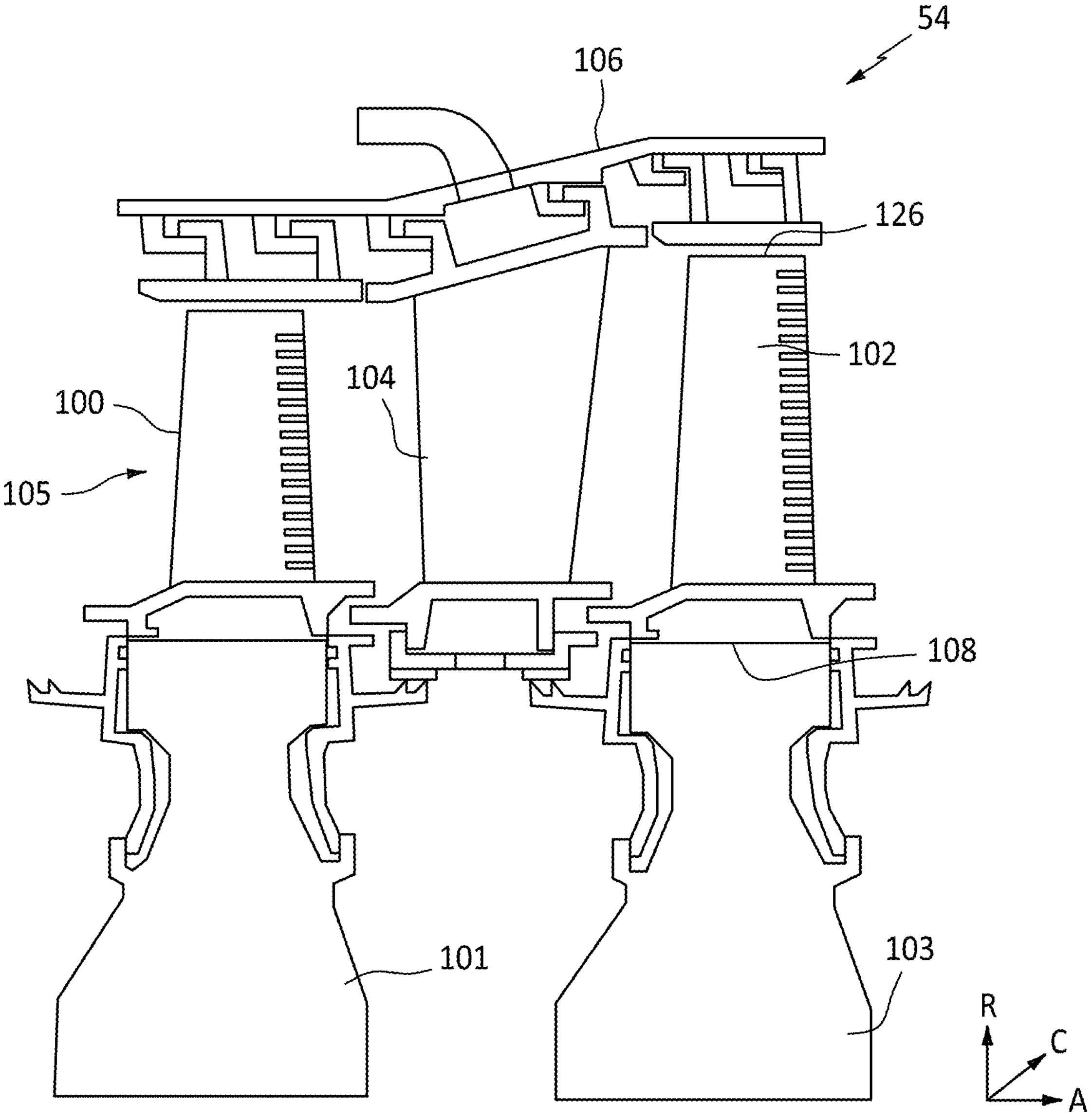
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis X-X'. The vane 104 may be coupled to a case 106 and may remain stationary relative to the axis X-X'.

The blade 102 may include an inner diameter edge 108 and an outer diameter edge 126 Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 or the outer diameter edge 126. The blade 102 may define cavities that transport the cooling airflow through the blade 102 to the other of the inner diameter edge 108 or the outer diameter edge 126.

Improved cooling passages will be described throughout the disclosure with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Figure 3:
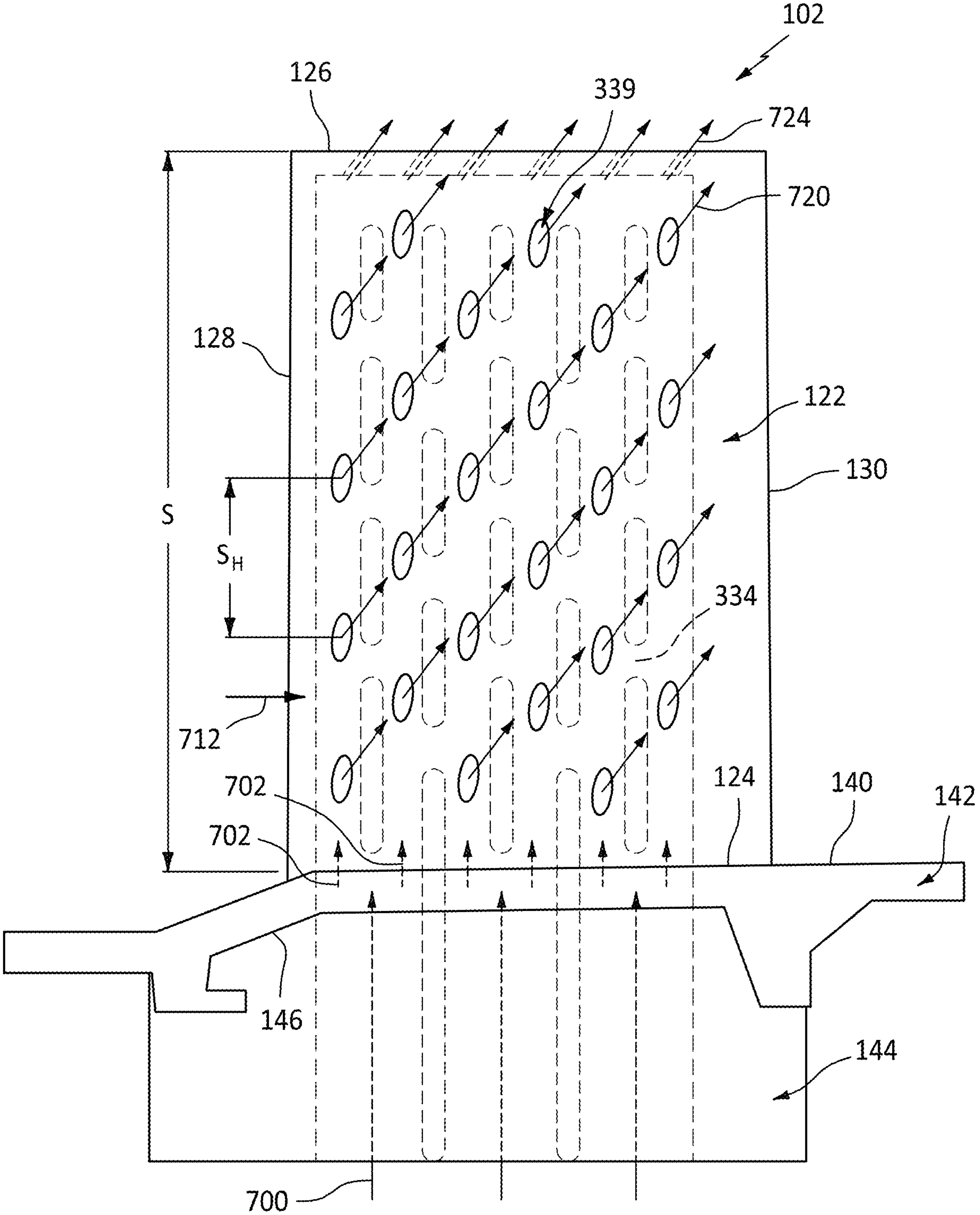
FIG. 3 is a schematic side view of a turbine blade for the high pressure turbine section of FIG. 2.

Turning now to FIG. 3, an engine turbine element 102 is illustrated as a blade (e.g., a high pressure turbine (HPT) blade) having an airfoil 122 which extends between an inboard end 124, and an opposing outboard end 126 (e.g., at a free tip), a spanwise distance or span S therebetween extending substantially in the engine radial direction. The airfoil also includes a leading edge 128 and an opposing trailing edge 130. A pressure side 132 (FIG. 4) and an opposing suction side 134 extend between the leading edge 128 and trailing edge 130.

The airfoil inboard end is disposed at the outboard surface 140 (FIG. 3) of a platform 142. An attachment root 144 (e.g., firtree) extends radially inward from the underside 146 of the platform.

The example turbine blade is cast of a high temperature nickel-based superalloy, such as a Ni-based single crystal (SX) superalloy (e.g., cast and machined). As discussed further below, an example of a manufacturing process is an investment casting process wherein the alloy is cast over a shelled casting core assembly (e.g., molded ceramic casting cores optionally with refractory metal core (RMC) components). Example ceramics include alumina and silica. The cores may be fired post-molding/pre-assembly. An example investment casting process is a lost wax process wherein the core assembly is overmolded with wax in a wax die to form a pattern for the blade. The pattern is in turn shelled (e.g., with a ceramic stucco). The shelled pattern (not shown) is dewaxed and hardened (e.g., a steam autoclave dewax followed by kiln hardening or a kiln hardening that also vaporizes or volatilizes the wax). Thereafter, open space in the resulting shell casts the alloy.

The blade may also have a thermal barrier coating (TBC) system (not shown) along at least a portion of the airfoil. An example coating covers the airfoil pressure and suction side surfaces and the gaspath-facing surfaces of the platform. An example coating comprises a metallic bondcoat (e.g., MCrAlY, e.g., thermal sprayed or cathodic arc sprayed) and one or more layers of ceramic (e.g., a YSZ and/or GSZ, e.g., thermal sprayed and/or vapor deposited such as EB-PVD).

Figure 4:
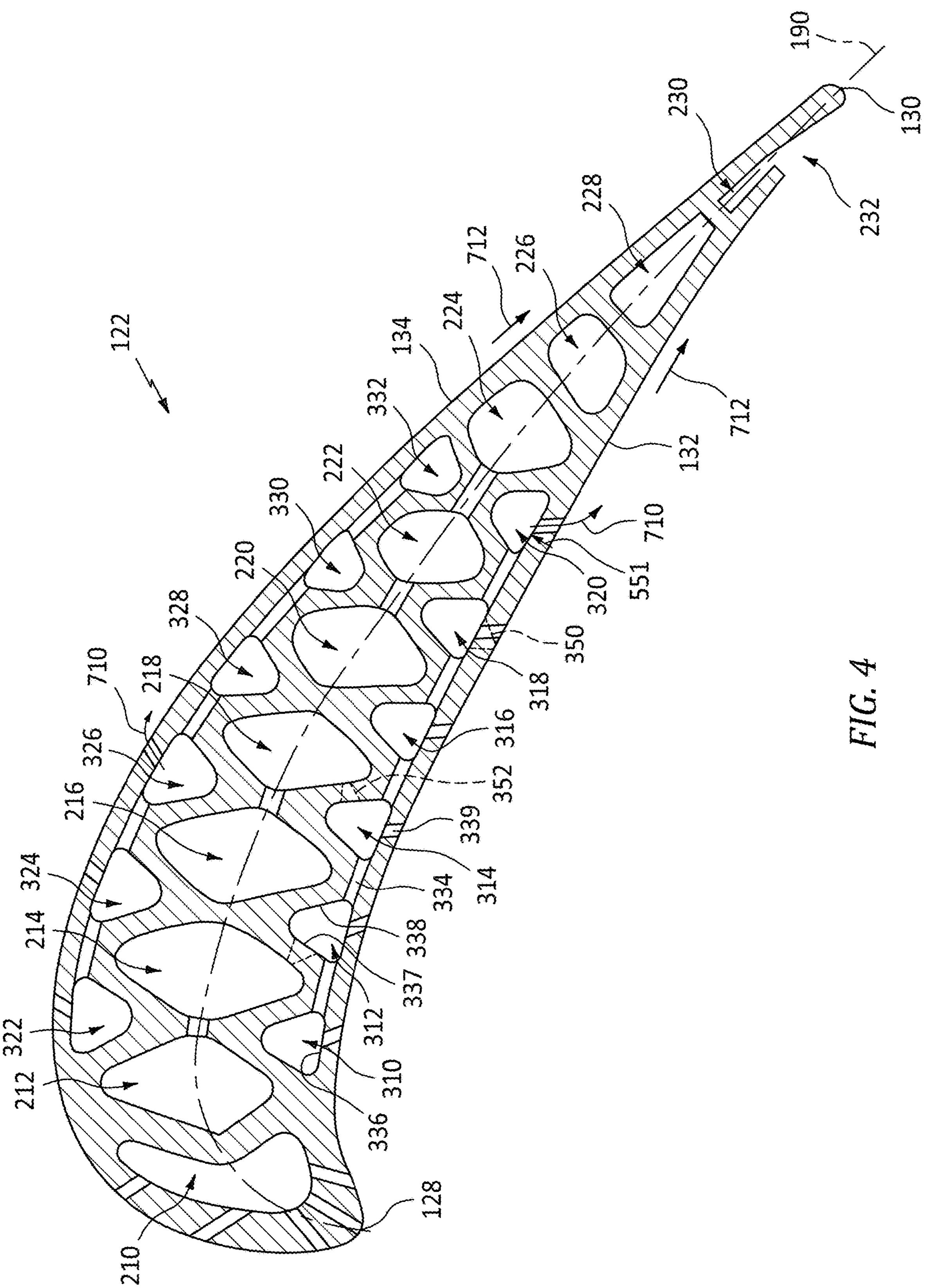
FIG. 4 is a transverse (generally tangential to the engine centerline) sectional view of an airfoil of the turbine blade of FIG. 3.

FIG. 4 also shows a camber line 190 in a transverse sectional view. Three-dimensionally, the camber is a mathematical surface formed by the camber lines along all the sequential sections. The blade has a cooling passageway system with a plurality of spanwise passageways (passageway legs/segments/sections) within the airfoil. These legs include a series of passageways straddling the camber line arrayed from upstream to downstream. These are main body passageways. These include a leading first passageway 210, a second passageway 212, a third passageway 214, a fourth passageway 216, a fifth passageway 218, a sixth passageway 220, a seventh passageway 222, an eighth passageway 224, a ninth passageway 226, and a tenth passageway 228. The tenth passageway may feed a discharge slot 230 having an outlet falling at or near the trailing edge (e.g., an outlet 232 shifted slightly to the pressure side in this example). The leading passageway 210 may be an impingement cavity fed by the second passageway 212.

As is discussed further below, the example passageways 212, 214, 216, 218, 220, 224, and 226 have rounded-corner quadrilateral sections with the orientations of passageways 212, 214, 216, 218, 220, and 222 being such that corners of the cross-section fall on or near the camber line. Similarly, the leading corner of passageway 224 is on or near the camber line. When combined with skin passageways 310, 312, 314, 316, 318, and 320 on the pressure side and 322, 324, 326, 328, 330, and 332 on the suction side, these form generally X-cross-section sections of cast blade substrate between the passageways. Nevertheless, there may be alternative shapes to the cross-sections/footprints of the main body passageways and associated skin passageways.

The main body passageways may be cast by one or more main body cores or feedcores having corresponding/complementary sections. In one example, a main body core has sections forming the main body passageways and trailing edge slot. Some of the sections may extend from trunks that form inlet trunks in the blade root. As noted above, the impingement cavity 210 would not have its own trunk but rather would be fed from the next main passageway/cavity 212 serving as a feed cavity. In various embodiments, the remaining passageways may have individual trunks or there may be merger of trunks (e.g., one trunk from one root ID inlet diverges to feed two (or more) of the main body passageways). Also, one or more of the main body passageways (passageway legs) may be represented by a downpass fed by one of the other passageways (passageway legs) rather than as an up-pass with its own trunk. And a vane would likely have opportunities for a yet more different feed arrangement.

In casting, a shelled pattern (not shown) includes a ceramic stucco shell over pattern wax. The pattern wax was overmolded to a casting core assembly including a main body core or feedcore and, as discussed further below, a pressure side skin core and a suction side skin core. An example main body core is a single molded core having respective sections respectively complementary to the main body passageways. An example number of the main body passageways and core sections is ten, more broadly two to sixteen or two to twelve.

Although the example main body core is a single piece, alternative multipiece combinations are possible. As is discussed further below, the skin cores may each be a single piece or otherwise an integral unit.

Figure 5:
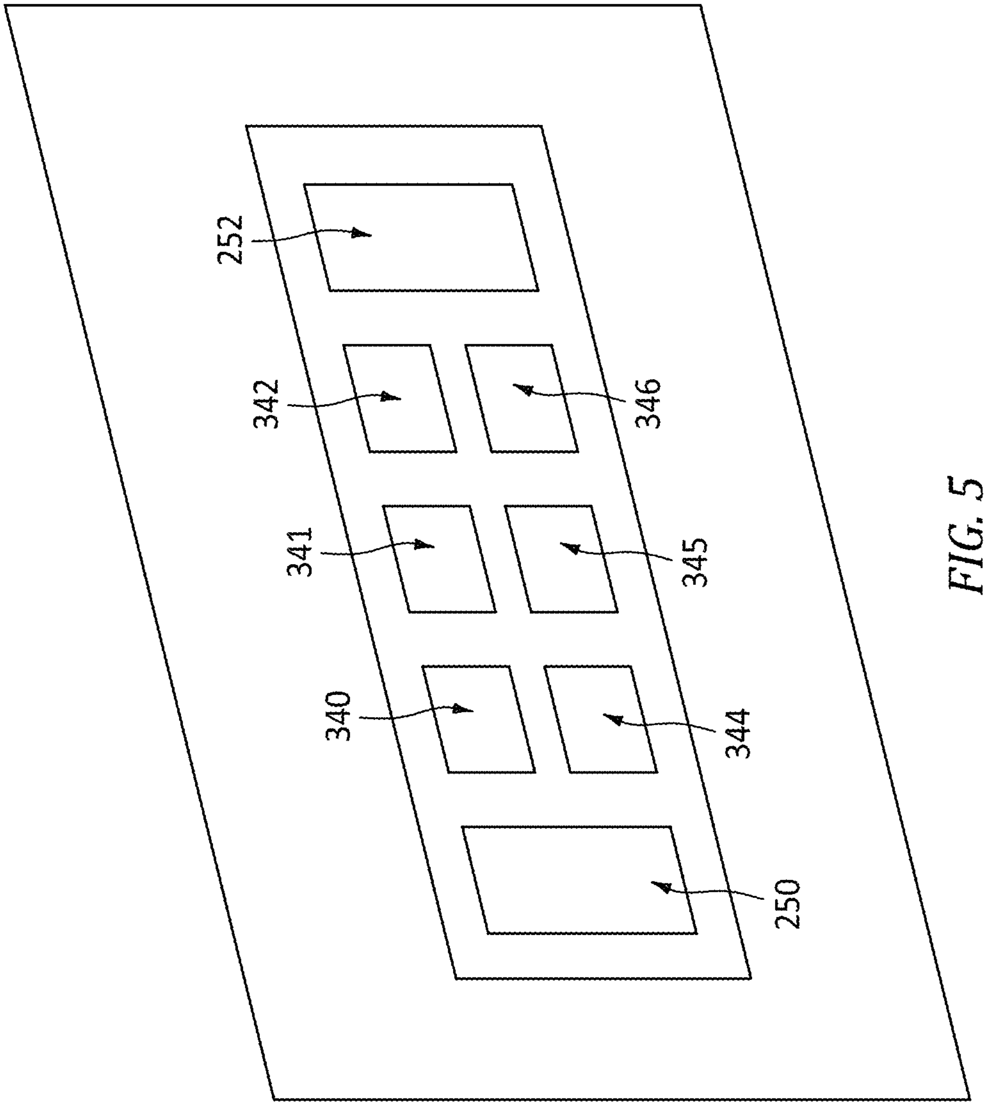
FIG. 5 is an inner diameter (ID) end view of a root of the turbine blade of FIG. 3.

The various spanwise passageways may connect to associated inlet ports (FIG. 5) in the root and may connect to associated outlet ports along the airfoil lateral surface or at the tip. FIG. 5 shows a leading inlet port (inlet) 250 and a trailing inlet port (inlet) 252. In this particular example, these two ports feed respective groups of the main body passageways. In this particular example, the leading inlet 250 feeds a trunk that branches to feed the first/leading four main body feed passageways 212, 214, 216, and 218 (and thus the leading passageway/cavity 210 via the feed passageway 212). Similarly, the trailing inlet 252 feeds a corresponding trunk that, in turn, branches to feed the trailing feed passageways 220, 222, 224, and 226 (the last of which feeds the passageway/cavity 228). Other configurations are possible with more or less or different branching.

In addition to these main body cooling passageways, as noted above, the example blade includes a series of a plurality of generally spanwise suction side passageways (passageway legs/segments/sections) and a series of a plurality similar pressure side passageways (e.g., as disclosed generally in the ’857 patent, ’364 patent, and ’550 patent noted above). An example count per side is four to ten. The pressure side passageways include, from upstream to downstream and fore to aft, passageways 310, 312, 314, 316, 318, and 320. In various implementations, the pressure side passageways may be cast by a single pressure side casting core (skin core—e.g., molded ceramic). As artifacts of such casting, adjacent passageways may be connected by a spanwise distributed plurality of linking passageways 334 which are artifacts of core ties linking adjacent core sections which respectively cast the passageways. Similarly, the suction side passageways are, from fore to aft and streamwise upstream to downstream, passageways 322, 324, 326, 328, 330, and 332. And as with the other passageways, the suction side skin core has similar/complementary sections with similar (but negative) surfaces.

As with the main body feed passageways, the skin passageways may be fed by associated inlets. FIG. 5 shows inlets 340, 341, and 342 in the root ID face/end for feeding the pressure side skin passageways. In this example, each of these skin passageway inlets feeds a corresponding trunk which, in turn, branches to form two adjacent ones of the skin passageways. Thus, inlet 340 feeds passageways 310 and 312; inlet 341 feeds passageways 314 and 316; and inlet 342 feeds passageways 318 and 320. In a similar fashion, along the suction side, inlet 344 feeds passageways 322 and 324; inlet 345 feeds passageways 326 and 328; and inlet 346 feeds passageways 330 and 332. FIG. 3 shows the pressure side skin passageway inlets each receiving an inlet flow 700 that splits into branches 702 for two passageway legs.

As is discussed further below, on each of the pressure side and suction side, each of the skin passageways nests between two adjacent main body passageways. To facilitate the nesting, the skin passageways and associated core sections may be of essentially rounded-corner triangular cross-section (e.g., as in the '364 patent) or otherwise similarly tapering depthwise inward (e.g., a rounded-corner trapezoidal cross-section/footprint). The base 336 (FIG. 4) of the triangle or trapezoid falls adjacent to and essentially parallel to the adjacent pressure side or suction side surface spaced apart therefrom by a wall thickness. Forward 337 and aft 338 sides of the triangle or trapezoidal cross-section converge away from that side surface toward the camber line as do the complementary/associated surfaces of the casting cores. There may be outlet passageways (holes) 339 (e.g., drilled holes (e.g., via electrodischarge machining (EDM), laser drilling, or water jet) or cast holes (e.g., via RMC) from the respective pressure side and suction side skin passageways to the airfoil pressure side and suction side. The example outlet passageways 339 are film cooling holes for discharging a film cooling flow 710. The film cooling holes are angled relative to the associated pressure side or suction side surface so as to have a component in the direction of gas flow 712 (FIG. 4,—external gas with which the flows 710 merge) over the surface. Example film cooling holes have centerlines substantially off-normal to the associated pressure side surface or suction side surface (e.g., at least 20° off-normal, more particularly, 20° to 70° or 50° to 70° or 60° to 70° with higher off-normal angles being associated with holes other than from the leading edge cavity). As in the '550 patent, or otherwise, the pressure side passageways and suction side passageways may extend from inlet ports (FIG. 5) along the root. As in the '550 patent, or otherwise, to accommodate the change in cross-section between root and airfoil, the cross-sectional shapes of the various passageways may transition between airfoil and root as may their nesting arrangement and branching (if any). The casting cores may similarly change.

The holes 339 may have a directional component parallel to the length of the passageway (the length being spanwise or close to spanwise and may be determined by the passageway median/centerline) For example, with drilled holes, the drilling may have a component radially inward (so that the film outlet flow has a radially outward (tipward) component rather than being essentially directed to the trailing edge) so that the hole centerline/axis has a component out of the plane of the paper).

As additional artifacts of manufacture, the pressure side passageways and suction side passageways have outboard/outward projections 350 (e.g., toward the respective pressure side 132 or suction side 134) and inboard/inward projections 352 (e.g., toward the adjacent main body feed passageway). As is discussed further below, these projections 350 and 352 are artifacts of locating core projections (bumpers) integrally molded with the associated skin cores for the pressure side passageways and suction side passageways. Example core projections/bumpers (and thus the passageway projections they cast) are frustoconical optionally with a rounded distal end/tip. Example conical half angle for such bumpers is 15°-30°, more particularly, 20°-30° or 20°-25°. Depending on tolerances, some of these projections 350 may penetrate to the adjacent pressure side or suction side, while others do not. Because these projections are part of the casting process, are normal to the airfoil surface, and do not reliably print out onto the airfoil surfaces, they cannot be used as film cooling outlets. Because they are normal to the surface, any air that does leak out through these projections will blow off the surface of the airfoil and will quickly get mixed in with the gaspath and not provide a layer of film isolating the gaspath air from the airfoil surface.

In the illustrated example, along each of the pressure side and suction side, the skin passageways (passageway legs) are of relatively consistent size (FIG. 4). Along the pressure side, each has a plurality of spanwise-arrayed film cooling outlet holes 339. Along the suction side, the first three passageways have film cooling outlet holes. The remaining three skin passageways have outlet holes at the airfoil tip and provide additional air to the first three passageways through passageways 334 cast by core ties. Along the pressure side, wherein all skin passageways have film cooling outlets 339, there will be little passageway-to-passageway pressure drop and thus very little, if any, flow through the linking passageways 334, resulting in low heat transfer coefficients in the linking passageways that, in turn, cause high metal temperatures locally around the linking passageways.

Figure 6:
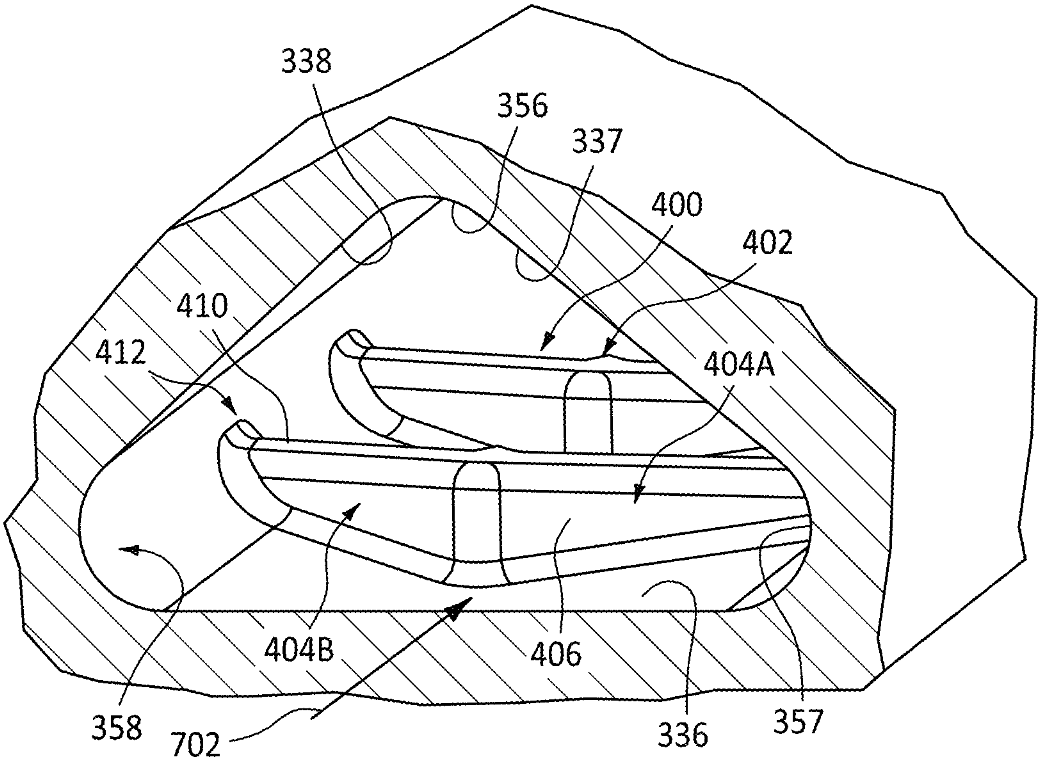
FIG. 6 is a cutaway view of a skin passageway of the airfoil looking generally downstream within the passageway.
Figure 7:
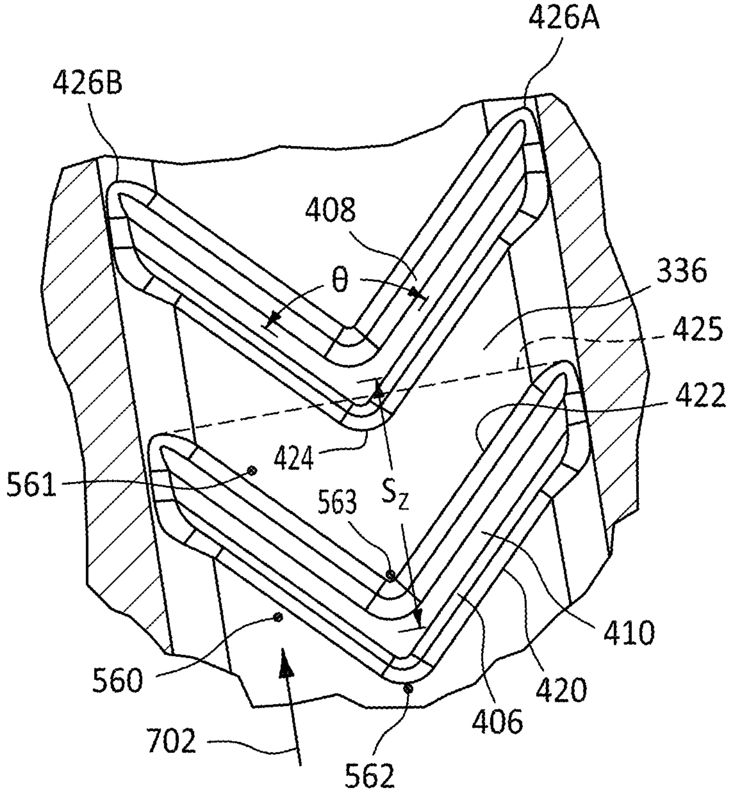
FIG. 7 is a cutaway view of the skin passageway looking generally outward toward the associated pressure side or suction side surface.
Figure 8:
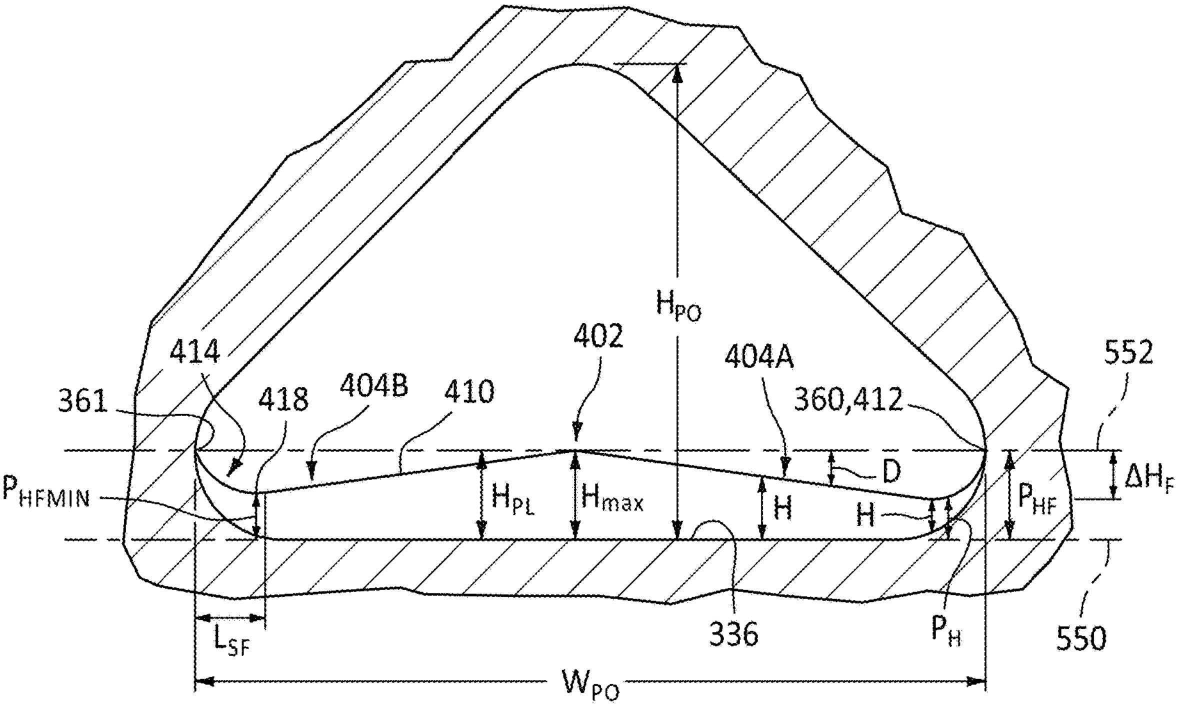
FIG. 8 is a cutaway view looking directly downstream along the skin passageway.

At least some of the skin passageways have streamwise-distributed trip strips 400 (FIGS. 6-8). The trip strips are shown along the outer surface 336 of the passageway. The illustrated trip strips are of chevron planform with a vertex or junction 402 of a pair of arms 404A, 404B at an angle θ (FIG. 7). Example angle θ is 60° to 120°, more narrowly 80° to 100°. With the example flow 702 within each skin passageway being generally radially outward, the example chevron trip strips are vertex-upstream oriented with a leading/upstream face 406, a downstream/trailing face 408, and a rim or ridgeline 410. The FIG. 6 illustration corresponds to a view of a pressure side passageway looking from the airfoil root toward the tip with the vertex of the chevron pointing upstream and fluidically toward one or more inlets and generally radially inward towards the airfoil root. A similar view of FIG. 6 with sides 337 and 338 swapped would represent a suction side passageway with the vertex of the chevron pointed upstream towards the airfoil root and generally radially inward. FIGS. 6-8 also show rounded corners or junctions of the sides of the triangular cross-section or the surfaces 336, 337, 338. Thus, corner/junction 356 is between sides 337, 338; corner/junction 357 is between sides/surfaces 336 and 337; and corner/junction 358 is between sides/surfaces 336 and 338.

As discussed below, the trip strips have central portions and a pair of terminal fillets. From a maximum height $H_{MAX}$ (FIG. 8) at an apex at the vertex/junction 402 the arms taper in height H downstream along the flowpath and laterally outward toward the associated corners/junctions 357, 358 toward distal ends 412. The trip strip rim 410 is at the maximum protrusion into the passageway at a given location transverse to the passageway/flow direction. Relative to the surrounding surface 336, the height H continues to decrease all the way to the distal ends 412. This height is measured relative to the adjacent surfaces of the intact passageway absent the chevrons. FIG. 8 also shows an overall passageway width $W_{PO}$ and an overall passageway height $H_{PO}$ and a parting line height $H_{PL}$ (of the die parting line that molded the casting core which, in turn cast the passageway). The width $W_{PO}$ is measured at the maximum width location between lateral extremes 360, 361 of the corners/junctions 357, 358. In key embodiments, this may be at or effectively at the parting line, thus, dimensions given for or relative to a maximum width line may be applied to or for the parting line and vice versa.

$H_{PL}$ is measured from the skin passageway surface 336 to a parting line 552.

Figure 9:
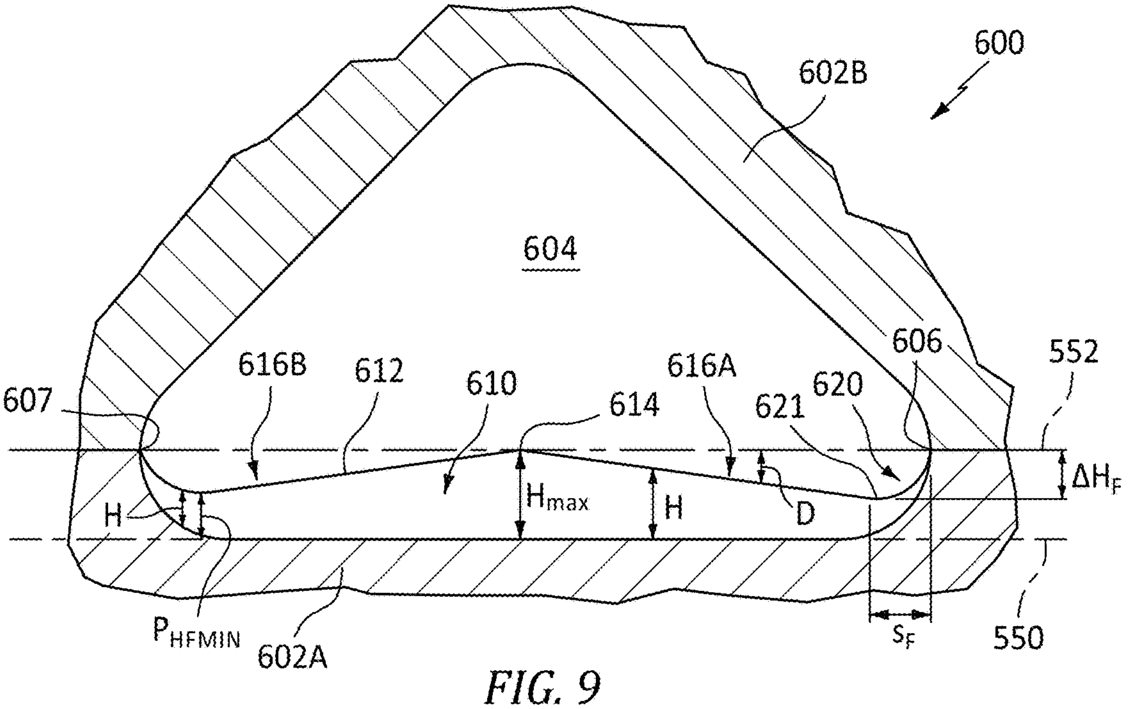
FIG. 9 is a sectional/cutaway view of a die for molding a casting core section for casting the skin passageway.
Figure 10:
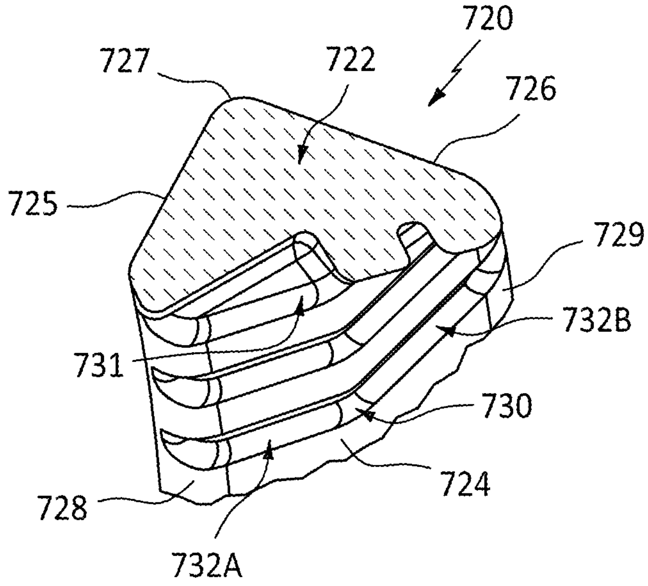
FIG. 10 is a view of a casting core section for casting the skin passageway.
Figure 11:
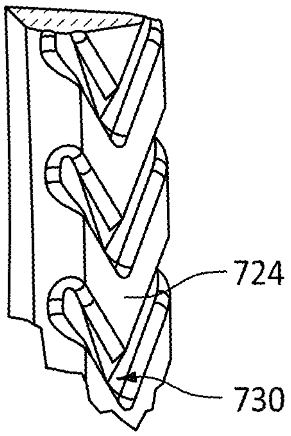
FIG. 11 is a second view of the casting core section.

The parting line is associated with the core molding die that molds the core which in turn casts the passageway. FIG. 9 shows a sectional view of a mold/die 600 for molding a core to cast the passageway. A local parting line 552 is shown between two die pieces 602A, 602B. A geometric constraint on the parting line is that it intersects the mold cavity 604 and associated molded core section at the furthest laterally outward portions of such cavity (extremes 606, 607) and core section. This allows separation of the die pieces without damage to the core section. The extremes 606 and 607 correspond to the passageway extremes 360, 361.

Figure 21:
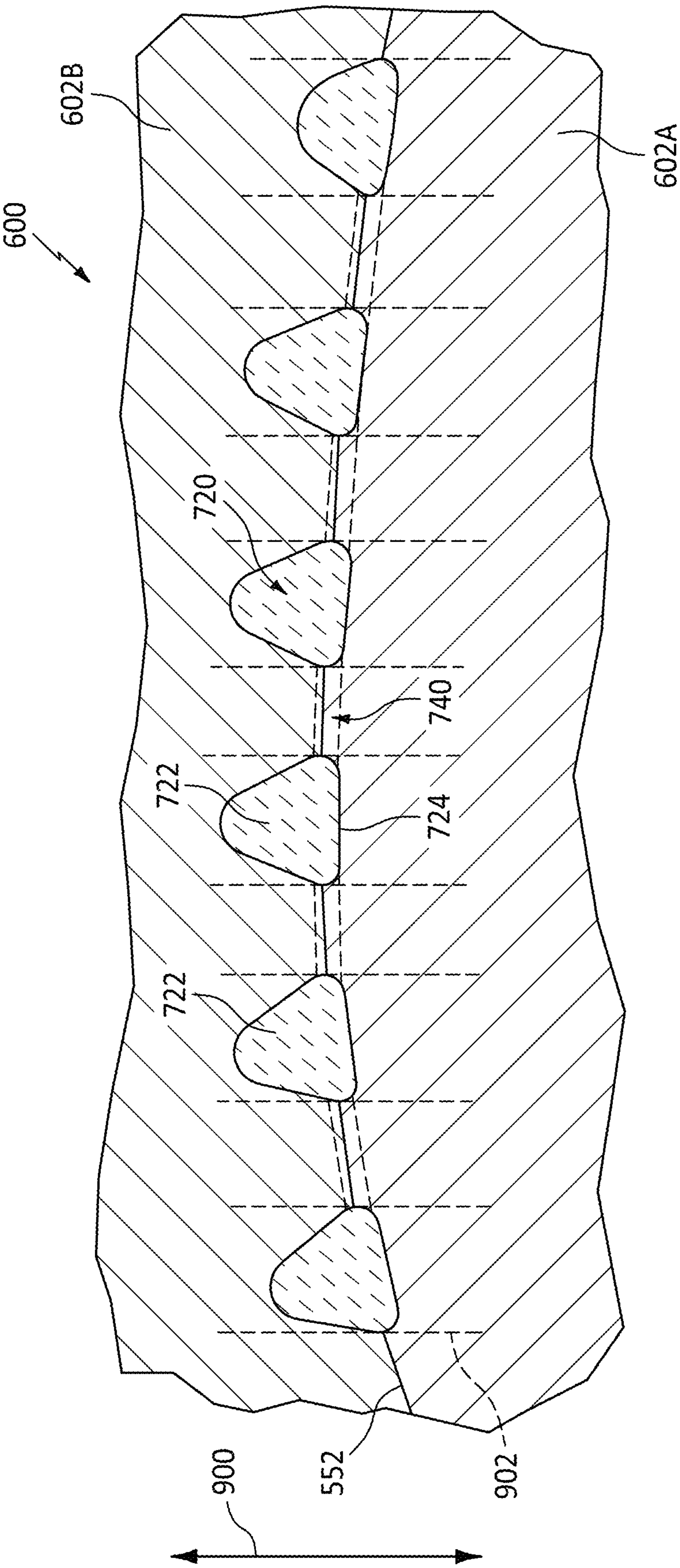
FIG. 21 is a sectional/cutaway view of the die of FIG. 9 molding a skincore.

FIGS. 10-13 show a casting core 720 used to form the trip strips. FIG. 21 shows the mold/die 600 molding the casting core 720. For simplicity like FIG. 4, FIG. 21 does not show the die protrusions/ridges or core grooves. The example core 720 is a skin core having multiple sections or legs 722 corresponding to the passageway sections along one of the pressure side and suction side. FIG. 21 shows a pull direction 900 for the die halves. This is the direction the die halves are pulled away from each other to release the core. FIG. 21 also shows, for each core section or leg 722, a pair of tangent lines 902 parallel to the pull direction and tangent to the associated cavity section of the die. To allow core release, this tangency location falls along the parting line. Given the concave arcuate streamwise nature of the pressure side of the airfoil, the core section outer faces 724 (and the associated faces of the die compartment sections) are not parallel to each other. Thus, there may be an asymmetry to the rounded corners of the segment cross-section to allow tangency at generally even height relative to the outer face (a central flat portion thereof or a tangent at a central portion thereof). For many blades, an example angle of the pull direction relative to the engine circumferential direction (FIG. 2) or the platform leading edge (FIG. 5) is from 0° to 60°. Alternatively, the pull direction could be measured against a line connecting the leading edge and the trailing edge of the airfoil (FIG. 4). In this case, example pull angle would be 30° to 90° relative to this LE-TE line.

Each of the sections or legs 722 may be connected to the others at one or more locations. Potential connection locations include a connecting block at a root of the blade (i.e., outside the ultimate machined part). Other connections include core ties 740 (FIG. 21) that cast the passageways 334 if present. Each casting core section 722 (FIG. 10) has faces 724, 725, 726 for respectively casting the three passageway faces 336, 337, 338 and corners/transitions 727, 728, 729 for casting the corners/junctions 356, 357, 358.

Figure 12:
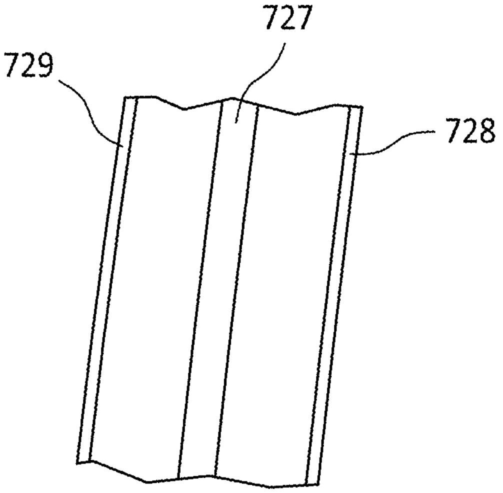
FIG. 12 is a third view of the casting core section.
Figure 13:
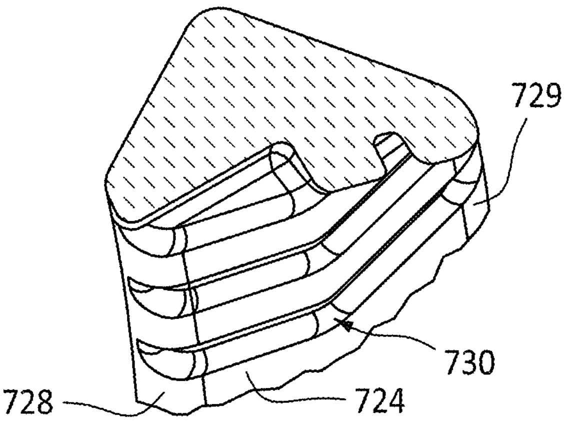
FIG. 13 is a fourth view of the casting core section.

Along the outer face 724, the core section has grooves 730 for casting respective trip strips. The grooves are complementary in shape to the chevron-formed trip strips. The grooves have vertexes 731 with corresponding arms 732A, 732B extending laterally outward. The depth profile of the grooves corresponds to the height profile of the trip strip and the die ridge that molds the grooves (again subject to minor ceramic shrinkage-type issues). FIG. 12 shows essentially intact edges at locations corresponding to the parting line.

Several proxies may be used for the parting line (e.g., for looking at the casting itself such as to estimate where the actual parting line fell). One proxy is a straight line connecting the lateral extremes 360, 361. These lateral extremes may be determined. in several ways. A first is by the intersections of inward surface normal from the adjacent pressure or suction side at tangency with the passageway.

Another proxy is to effectively assume the parting direction 900 when a plurality of core segments are involved (e.g., an example of at least four for the pressure side or suction side, more narrowly, four to ten). The proxy involves assuming that there is some direction 900 shared by each of the passageway segments/sections so that the tangents 902 parallel thereto (at the passageway rounded corners for the triangular embodiment) of all sections cause the particular relationships described above and below to be satisfied for all such passageways. Such tangents 902 then determine the lateral extremes 360, 361 and the inferred straight parting line 552 joining them. For example, one relationship that may be so satisfied is that the parting line extended across each of the passageway sections is essentially parallel to the outer face 724 (or central section thereof). For example, this may be within 10° or 5° or 2° of parallel.

The maximum height $H_{MAX}$ of the trip strip is less than or equal to the associated parting line height $H_{PL}$ at the same location. In many expected situations, the trip strip height $H_{MAX}$ may be 80% to 100% of the associated parting line height $H_{PL}$. The distance D between the rim 410 of the trip strip at the location of $H_{MAX}$ and the parting line 552 may be an example 200 micrometers or less, more narrowly, 125 micrometers or less (shown as zero in FIG. 8). With the taper, Example D will then progressively increase laterally outward over a tapering region of the rib reaching a maximum at the associated fillet and then decreasing further along the fillet to the distal end 412 (e.g., again shown as zero). A similar depth profile exists in the core molding die 600 of FIG. 9 discussed above.

An additional height may be measured as a protrusion height $P_H$ above a local baseline 550 (local to the particular location to a direction along the length of flow within the passageway). The baseline 550 may be defined as the passageway surface intersection with an inward surface normal 551 (FIG. 4) from the adjacent outer surface (e.g., the pressure side or the suction side of the substrate (ignoring any film outlets) at a location (FIG. 7) at the transverse center of the passageway. The baseline may be measured at a central flat portion of the surface 336 or a tangent at a central portion thereof. Such a baseline 550 may similarly be applied to the die of FIG. 9 as to the passageway of FIG. 8 and also to the core section itself.

The height H and protrusion height $P_H$ may be measured with reference to a line between locations ahead of and/or behind the trip strip (e.g., what would have been a smooth generally straight surface if the trip strip had not been there). FIG. 7 shows locations ahead of 560 or behind 561 the trip strip relative to which the height H between them may be measured. The specific central locations 562 and 563 ahead of and behind are also shown.

Due to the rounded corners, at the rounder corners, the protrusion height $P_H$ may upwardly depart from the height H approaching the corners/junctions. This can effectively create a fillet 414 bridging up along the rounded corner/junction and reaching a terminal peak value of $P_{HF}$. Along the fillet, the rim 410 has a concavity (inward concavity into the interior of the passageway) and passes through a location 418 (FIG. 8) of minimum protrusion height (discussed below). FIG. 7 shows a leading extreme 420 and trailing extreme 422 at the intact surfaces of the rounded corner passageway. An upstream apex of the leading extreme is shown as 424 and downstreammost locations of the trailing extreme along the chevron arms are shown as 426A, 426B. Example spacing $S_Z$ and internesting is such that the apex 424 is ahead/upstream of a line 425 joining the locations 426A, 426B.

FIG. 9 also shows the rim 612 of a ridge 610 of the die that corresponds to one of the trip strips to be cast. FIG. 9 also shows a central apex 614 corresponding to the vertex/junction 402. The ridge 610 has respective arms 616A, 616B corresponding to the chevron arms 404A and 404B tapering in a similar fashion with similar dimensions. The dimensions are subject to slight variations associated with any shrinkage of the core molded in the die 600. The example arms have tapering height terminating in a fillet 620 associated with the rounded corners at the distal ends. the fillets extend to a location at or shy of the parting line 552. Similarly, the apex 614 is at or below the parting line. This apex height issue is largely an artifact of ease of die machining and limitation of material removal.

The ridge 610 has upstream and downstream faces again corresponding to the associated faces 406, 408 of the associated trip strip. The ridges are in a longitudinal/streamwise (relative to the associated passageway) array corresponding to that of the passageway.

Figure 14:
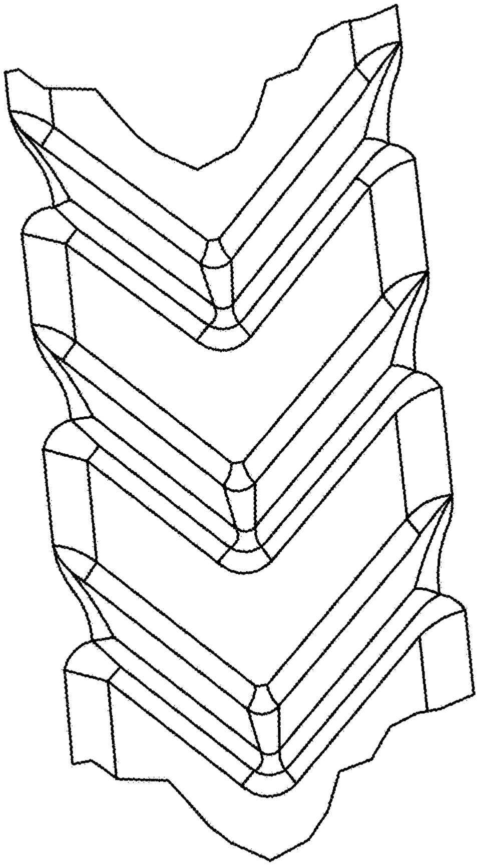
FIG. 14 is a view of an alternate casting core.
Figure 15:
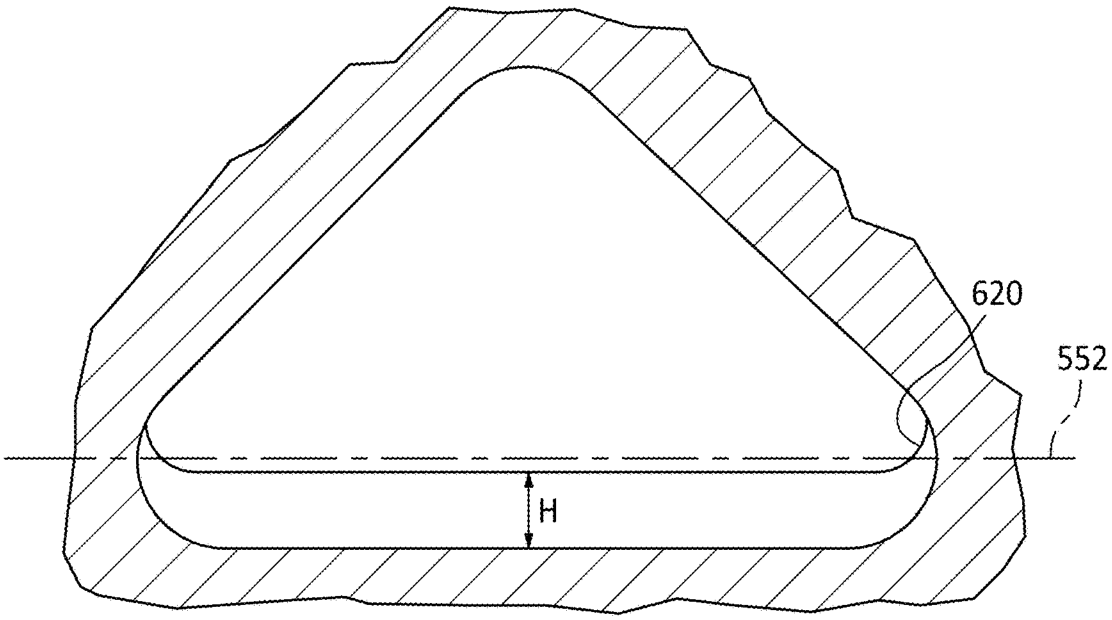
FIG. 15 is a view of a passageway cast by the alternate casting core.

FIGS. 14 and 15 show a hypothetical alternative core with grooves for casting FIG. 15's generally even height chevron trip strips/rib. Among the majority of the transverse dimension, the height is such that the trough of the groove or rib of the resulting passageway would be below the parting plane. Thus, this alternative height may be smaller than the FIG. 8 $H_{MAX}$ value but larger than the height along an outboard lateral portion of the FIG. 8 chevron arms (e.g., prior to any fillet region). The fillet 620 of the trip strip cast by the FIG. 14 embodiment is shown in FIG. 15, however, extending across the parting line 552. This can impose several negative consequences relative to the FIG. 10 embodiment.

First, it may increase complexity of the die halves for proper core release. Specifically, interfitting portions of the die halves must locally cross the parting line to allow core release. This can create additional effort and material wasted. For example, it may require die material removal away from the cavity to get down to the parting line if there is to be a protrusion above the parting line. In contrast, the FIG. 9 die embodiment involves less die material removal and may limit the more complex features to one half (602A) of the die.

Additionally, the FIG. 14 embodiment effectively creates rounded sawtooth edges of the cast passageway that can lead to stress concentrations. By contrast, the FIG. 10-13 embodiment has a substantially smaller sawtoothing effect provided by intact edges 728, 729.

In one characterization of the fillet 620 (FIG. 9), the fillet has a transverse span $S_F$ and a height $\Delta H_F$. The transverse span $S_F$ is measured along a concavity of the rim 410. In this example, $\Delta H_F$ is measured from the location 621 of minimum $P_H$ (value $P_{HFMIN}$) to the $P_{HF}$ value at the outboard apex of the fillet (which forms a max. value for the fillet). Example $\Delta H_F$ is about 125 micrometers, more broadly, 75 micrometers to 250 micrometers or 100 micrometers to 180 micrometers.

In one characterization, the $P_H$ value $P_{HF}$ at the corner/junction is 80%- to 120% of $H_{MAX}$, more narrowly 90% to 110% or 90% to 105%.

In one characterization, example $P_{HF}$ reaches a minimum $P_{HFMIN}$ of 30% to 80% of $H_{MAX}$ or, more narrowly, 35% to 70% or 40% to 60%.

In one characterization, the span $S_F$ is at least 3% percent of $W_{PO}$, more narrowly 4% to 15% or 5% to 12% or 5% to 8%.

In one characterization, the taper is such that average H not including the fillets is 65% to 90% of $H_{MAX}$ or 70% to 80%.

Figure 16:
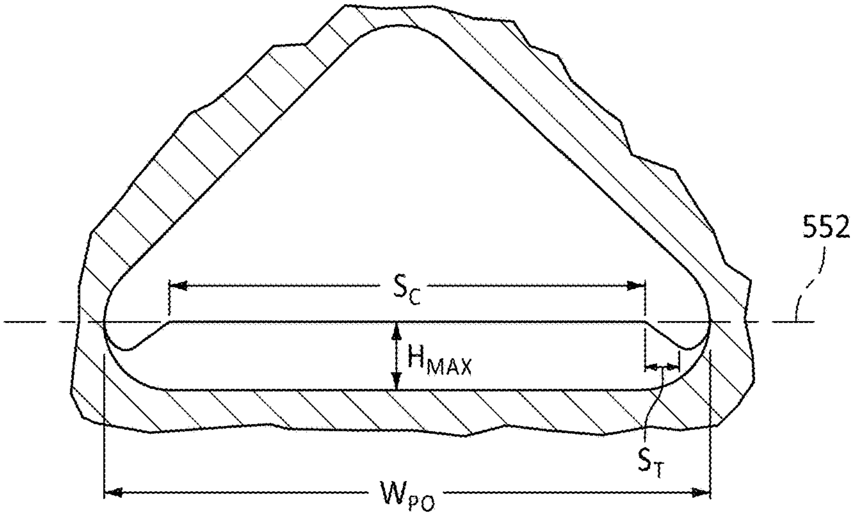
FIGS. 16-20 are cutaway views looking directly downstream along alternate skin passageways.
Figure 17:
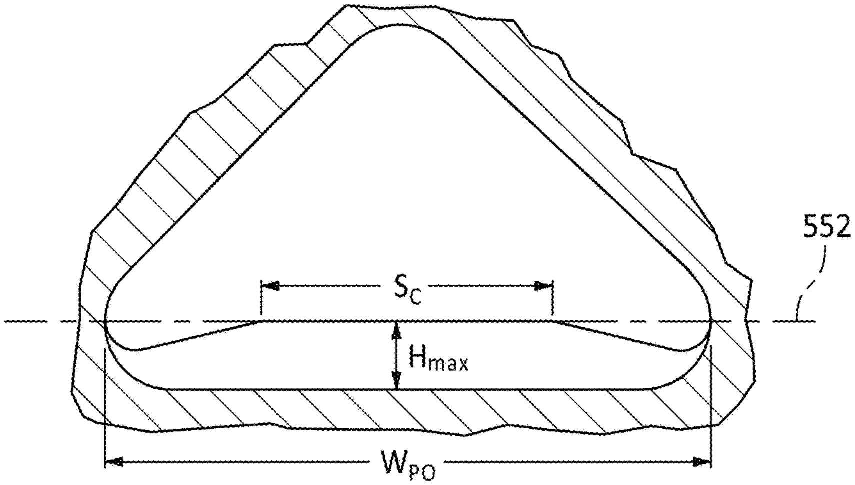
Figure 18:
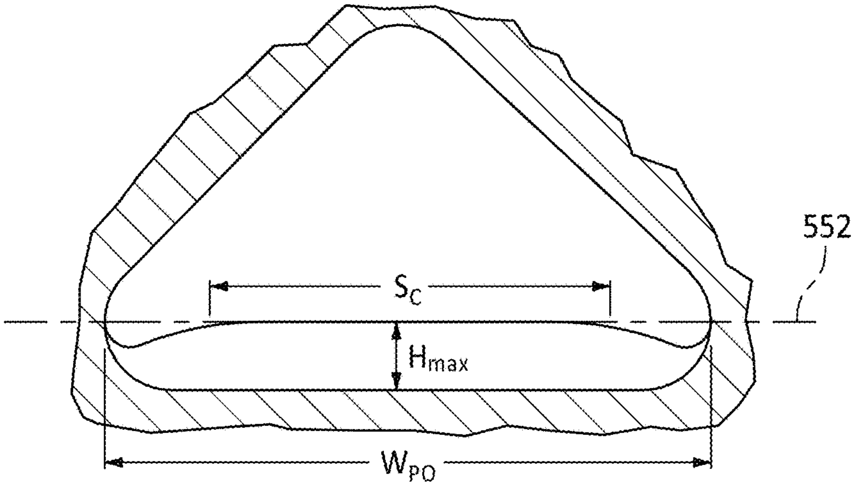

However, a possible modification of the FIGS. 6-13 shape is to have a central generally even height portion $S_C$ but tapering to the fillet. FIGS. 16-18 show examples. For example, the region of generally even height may be defined over an area where H is at least 90% of $H_{MAX}$. Example $S_C$ is broadly 10% to 80% of $W_{PO}$ or more narrowly 40% to 80% or 40% to 75%. The FIG. 16 example has a relatively broader true even height region with sharp transition to a downslope. Its transverse span or width $S_C$ extends for a span of an example 70% to 80% of $W_{PO}$. In the embodiment of FIG. 16, each tapered region extends a span $S_T$ 5% to 10% span of the max passage width $W_{PO}$. The tapered region may be defined as a full region of such tapering of protrusion or height and thus may include a tapering section of the generally even height portion and of the fillet.

The dimensions and relationships discussed may exist at multiple locations along the length(s) of the passageway(s) or associated core leg(s) or section(s) or die compartment/cavity/chamber leg(s) or section(s). For example they may exist for multiple to all protrusions in a given passageway and for multiple to all protrusions of multiple to all passageways having such protrusions at a given reference location (e.g., all protrusions intersected by a given transverse cut plane (e.g. transverse to a spanwise direction or transvers to a length of one or more passageway or core or die section such as in the transverse section of FIG. 21 or FIG. 4).

The FIG. 17 example has a smaller span (e.g., an example 40% to 60% of $W_{PO}$) of even height portion $S_C$, leading to a generally constant taper until the fillet. In the embodiment of FIG. 17, each tapered region extends for an $S_T$ of 15% to 25% span of the max passage width $W_{PO}$. The FIG. 18 example has more of a continuously curving convex-concave transition to the fillet.

Figure 19:
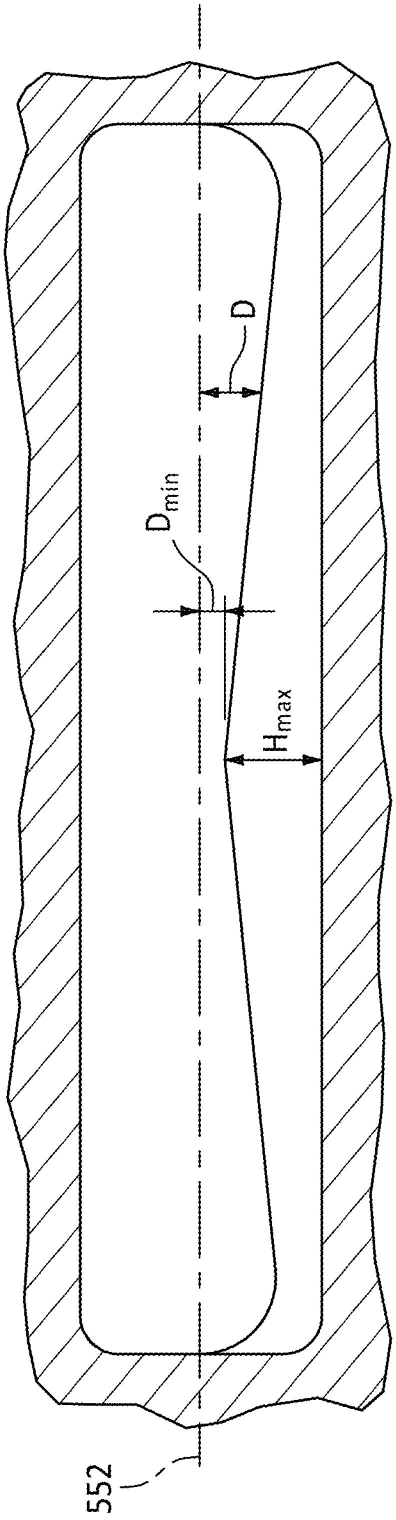
Figure 20:
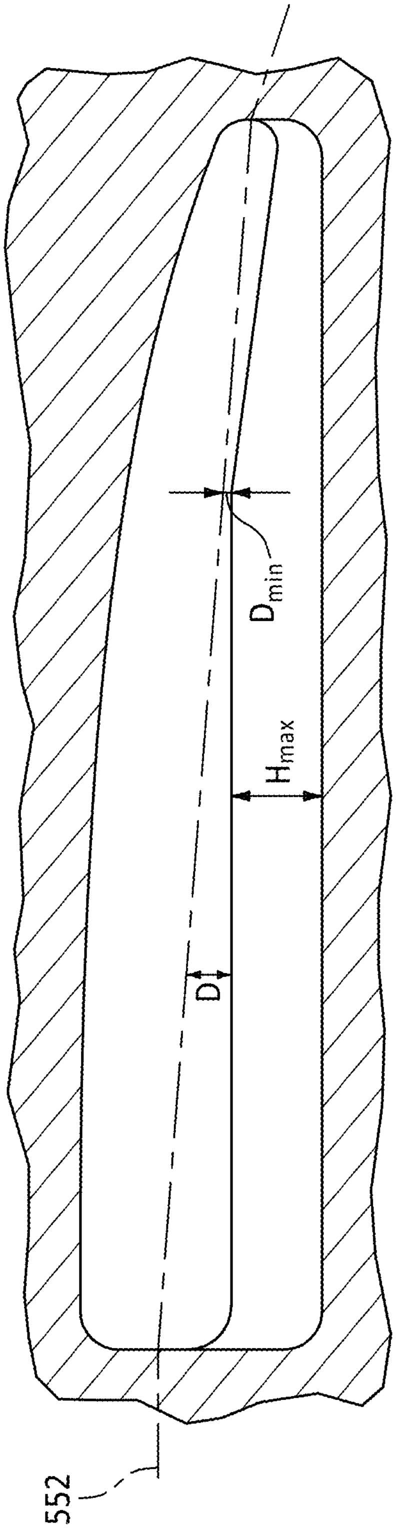

FIGS. 19 and 20 show two different cross-sectional shapes not rounded-corner triangles. FIG. 19 shows a similar tapering apex situation to that described above. FIG. 20 shows a generally even height portion extending to a fillet at one edge/extreme and then a gradual taper to a fillet at the opposition. The gradual taper is associated with a reduction in overall passageway height. Whereas the FIG. 8 embodiment has in a region away from the fillets the minimum value D ($D_{MIN}$) as zero, in FIGS. 19 and 20, it is nonzero. Similarly in FIG. 19, both fillets have their minimum D nonzero. Depending on implementation, that fillet minimum D (e.g., at the lateral end) may be smaller than the minimum D away from the fillets. Although the lefthand side of FIG. 20 has constant H and $P_H$ away from the fillet, a slight right to left H increase shows how $D_{MIN}$ and $H_{MAX}$ need not occur at the same transverse location. FIG. 20 thus also has only a single local protrusion height trough/minimum (along the right hand side fillet with none at the left) whereas the others have such local troughs/minima at both sides.

In alternative embodiments, the footprints may be other than chevron-shaped. They may be diagonal trip strips essentially straight in planform.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Although illustrated in the context of a blade, the basic geometries and flows and associated casting cores and methods may be used to provide similar passageways and air flows in other. As noted above, this includes other forms of blades as well as vanes. Additionally, such cores and methods may be used to cast such passageways in non-airfoil elements. One example is struts that extend through the gaspath. Additional modifications may be made for yet further different elements such as blade outer airseals (BOAS). In an example BOAS, the cores (and resulting passageways) may extend circumferentially or longitudinally relative to the ultimate position of the BOAS in the engine. For example, the base of a triangular skin core segment/section/leg may fall along the OD surface of an ID wall of the BOAS. In such a situation, a second skin core may be more radially outboard or may be deleted altogether. In one group of examples the lengths of the passageways may be transverse to the gaspath so that the skin passageways are sequentially arrayed from upstream to downstream along the gaspath. Accordingly, other embodiments are within the scope of the following claims.

What is claimed is:

1. A turbine engine airfoil element comprising:

an airfoil having:

an exterior surface including a pressure side and a suction side; and a plurality of spanwise passageways including:

a plurality of main body passageways along a camber line; and a plurality of skin passageways between the main body passageways and the exterior surface, wherein;

the skin passageways have:

a downstream direction from one or more inlets;

a skin side;

first and second lateral rounded transitions from the skin side;

a parting line; and a longitudinally spaced plurality of protrusions from the skin side; and the protrusions have a height profile having:

first and second tapering portions tapering from a maximum height, the first and second portions extending downstream; and first and second inwardly concave transitions to the skin passageway lateral rounded transitions.

2. The turbine engine airfoil element of claim 1 wherein: the height profile is measured relative to a baseline formed by a passageway surface intersection with an inward surface normal from the adjacent outer surface at a location ahead of or behind the protrusion.

3. The turbine engine airfoil element of claim 1 wherein: the tapering is such that the entirety of each of the protrusions, including the concave transitions, remains below a height of a maximum transverse width of the skin passageway.

4. The turbine engine airfoil element of claim 1 wherein: the maximum height is at a location at or below a height of maximum transverse width of the skin passageway.

5. The turbine engine airfoil element of claim 4 wherein: the inwardly concave transitions have a transverse span $S_F$ of at least 3% percent of a transverse width $W_{PO}$ of the associated passageway.

6. The turbine engine airfoil element of claim 4 wherein: the inwardly concave transitions have maximum protrusion $P_{HF}$ at a location at or below a height of maximum transverse width of the skin passageway.

7. The turbine engine airfoil element of claim 1 wherein: an average height of the protrusions away from the transitions is 65% to 90% of the maximum height.

8. The turbine engine airfoil element of claim 1 wherein: each of the tapering portions extends along a transverse span of at least 10% of the maximum passageway width $W_{PO}$.

9. The turbine engine airfoil element of claim 1 wherein: the height of each protrusion along a transverse span of at least 3% of a transverse width $W_{PO}$ of the associated passageway is at least 30% of the maximum height.

10. The turbine engine airfoil element of claim 1 wherein: the height of each protrusion along a transverse span of 10% to 90% of a transverse width $W_{PO}$ of the associated passageway is at least 30% of the maximum height.

11. The turbine engine airfoil element of claim 1 wherein: protrusions have nested chevron footprints such that an upstream apex of a leading edge of a given protrusion is upstream of downstreammost extremes of the trailing edge of a protrusion ahead.

12. The turbine engine airfoil element of claim 1 wherein: adjacent said pressure side skin passageways connect to each other via a plurality of linking passageways.

13. The turbine engine airfoil element of claim 1 wherein: the skin passageways have rounded-corner triangular or quadrilateral cross-section.

14. The turbine engine airfoil element of claim 1 comprising:

four to ten said skin passageways.

15. The turbine engine airfoil element of claim 1 wherein: the skin passageways each extend over at least 50% of a span of the airfoil.

16. The turbine engine airfoil element of claim 1 being a blade having an attachment root wherein:

the main body passageways extend from associated inlets at an inner diameter (ID) end of the root; and the skin passageways extend from associated inlets at the inner diameter (ID) end of the root.

17. A turbine engine including the turbine engine airfoil element of claim 1.

18. A method for manufacturing the turbine engine airfoil element of claim 1, the method comprising:

assembling to each other:

a ceramic feedcore for forming the plurality of main body passageways; and a ceramic skin core with grooves for forming the plurality of skin passageways and the associated protrusions;

overmolding the assembly with a fugitive;

shelling the fugitive to form a shell;

casting alloy in the shell; and deshelling and decoring the cast alloy, optionally the method further comprises:

molding the ceramic skin core in a die having a first piece and a second piece, the first piece having ridges that mold the grooves;

separating the first piece from the second piece; and releasing the core from the die, optionally wherein:

the plurality of grooves are not molded by the second piece;

the ridges are shaped with a rim tapering in height but having a fillet transitioning to project toward a local parting line between the first piece and the second piece.

19. A method for using the turbine engine airfoil element of claim 1, the method comprising:

driving an airflow through the plurality of spanwise passageways; and said airflow exiting through a plurality of outlets from the skin passageways.

20. A turbine engine airfoil element comprising:

an airfoil having:

an exterior surface having a pressure side and a suction side; and a plurality skin passageways along one of the pressure side and the suction side and having:

a downstream direction from one or more inlets;

a skin side;

first and second lateral rounded transitions from the skin side; and a longitudinally spaced plurality of protrusions from the skin side, wherein a pull direction exists such that;

in transverse section, the skin passageways have a respective pair of lateral intersections with tangents parallel to said pull direction;

for each said skin passageway, a parting line joins the intersections;

the protrusions have a height profile having:

first and second tapering portions tapering from a maximum height, the first and second tapering portions extending downstream; and first and second inwardly concave transitions to the skin passageway lateral rounded transitions;

a difference (D) between a maximum height of the protrusions and a height of the parting line being not more than 200 micrometers;

a difference (D) between a terminal height of the concave transitions and a height of the parting line is not more than 200 micrometers.

21. A turbine engine airfoil element comprising:

an airfoil having:

an exterior surface; and a plurality of spanwise passageways including:

a plurality of main body passageways along a camber line; and a plurality of skin passageways between the main body passageways and the exterior surface, wherein;

the skin passageways have:

a downstream direction from one or more inlets;

a skin side;

a maximum passage width;

a parting line height between the skin side and a reference line representing the maximum passage width;

first and second lateral rounded transitions from the skin side; and a longitudinally spaced plurality of protrusions from the skin side; and wherein;

the protrusions have a height profile having:

first and second inwardly concave transitions to the skin passageway respective first and second lateral rounded transitions; and a first tapered portion between a maximum protrusion height and the first inwardly concave transition; and wherein;

the maximum protrusion height is between 80% and 100% of the parting line height; and wherein:

the height profile is measured relative to a baseline formed by a passageway surface intersection with an inward surface normal from the exterior surface at a location ahead of or behind the protrusion.

* * * * *